US010619504B2

(12) United States Patent
Tyler et al.

(10) Patent No.: US 10,619,504 B2
(45) Date of Patent: Apr. 14, 2020

(54) GAS TURBINE ENGINE BLADE OUTER AIR SEAL COOLING HOLE CONFIGURATION

(71) Applicant: United Technologies Corporation, Farmington, CT (US)

(72) Inventors: Terence P. Tyler, East Waterboro, ME (US); Thurman Carlo Dabbs, Dover, NH (US); Kevin J. Ryan, Alfred, ME (US); Nathan K. Galle, Portland, ME (US)

(73) Assignee: United Technologies Corporation, Farmington, CT (US)

( * ) Notice: Subject to any disclaimer, the term of this patent is extended or adjusted under 35 U.S.C. 154(b) by 262 days.

(21) Appl. No.: 15/798,763

(22) Filed: Oct. 31, 2017

(65) Prior Publication Data

US 2019/0128134 A1    May 2, 2019

(51) Int. Cl.
*F01D 11/08* (2006.01)
*F01D 25/12* (2006.01)

(52) U.S. Cl.
CPC .............. *F01D 11/08* (2013.01); *F01D 25/12* (2013.01); *F05D 2220/32* (2013.01); *F05D 2240/11* (2013.01); *F05D 2240/55* (2013.01); *F05D 2250/74* (2013.01); *F05D 2260/202* (2013.01)

(58) Field of Classification Search
CPC ...... F01D 11/08; F01D 25/12; F05D 2220/32; F05D 2260/202; F05D 2240/55; F05D 2250/74; F05D 2240/11
See application file for complete search history.

(56) References Cited

U.S. PATENT DOCUMENTS

| 6,196,792 | B1 | 3/2001 | Lee et al. |
| 7,147,432 | B2 | 12/2006 | Lowe et al. |
| 7,296,967 | B2 | 11/2007 | Shapiro |
| 8,714,918 | B2 * | 5/2014 | Tibbott ................... F01D 11/08 415/173.1 |
| 2010/0232929 | A1 * | 9/2010 | Joe ........................... F01D 9/04 415/1 |
| 2016/0177735 | A1 * | 6/2016 | Bradshaw ............... F01D 5/186 60/806 |
| 2016/0201467 | A1 | 7/2016 | Milligan et al. |
| 2017/0044931 | A1 | 2/2017 | Lutjen et al. |
| 2017/0198599 | A1 | 7/2017 | Ryan et al. |
| 2017/0198603 | A1 | 7/2017 | Ryan et al. |

* cited by examiner

*Primary Examiner* — Sizo B Vilakazi
(74) *Attorney, Agent, or Firm* — Carlson, Gaskey & Olds, P.C.

(57) ABSTRACT

A blade outer air seal includes a body that extends axially between forward and aft rails and circumferentially between lateral faces. The body has an inner arcuate surface that is configured to seal relative to a blade tip. The body includes a plurality of cooling holes that extend through an exterior surface of the body. Each of the plurality of cooling holes break through the exterior surface at geometric coordinates in accordance with Cartesian coordinate values of X, Y and Z as set forth in Tables 1, 2 and 3. Each of the geometric coordinates is measured from a reference point on the body.

23 Claims, 3 Drawing Sheets

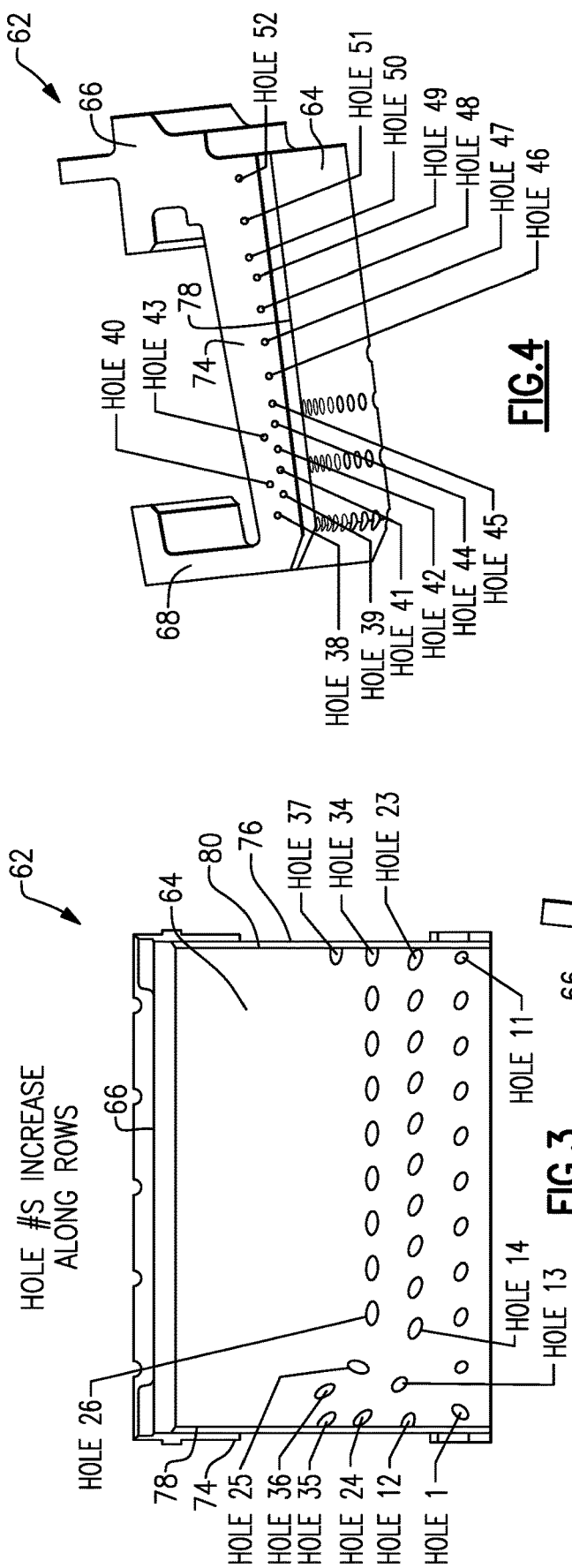
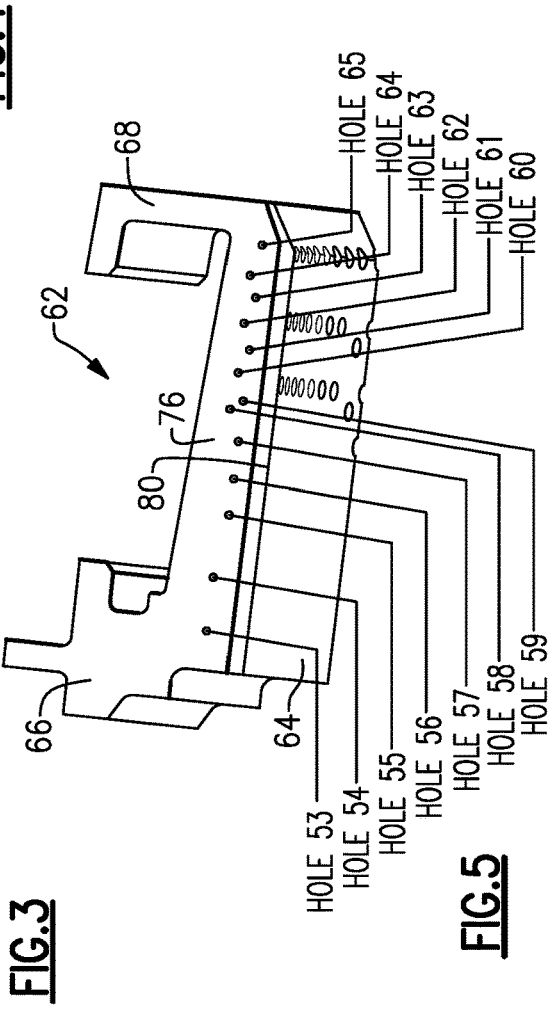
FIG.3
FIG.4
FIG.5

GAS TURBINE ENGINE BLADE OUTER AIR SEAL COOLING HOLE CONFIGURATION

BACKGROUND OF THE INVENTION

The present disclosure relates to blade outer air seals (BOAS) for gas turbine engines more particularly to BOAS for gas turbine engines with cooling holes defined therein.

Blade outer air seals (BOAS) can be disposed in turbine sections of turbomachines for sealing the gap between a turbine blade tip and the inner wall of the turbomachine casing. In such uses, the BOAS can be exposed to extreme heat and can require cooling. Accordingly, it is desirable to provide adequate cooling to the BOAS.

SUMMARY

In one exemplary embodiment, a blade outer air seal includes a body that extends axially between forward and aft rails and circumferentially between lateral faces. The body has an inner arcuate surface that is configured to seal relative to a blade tip. The body includes a plurality of cooling holes that extend through an exterior surface of the body. Each of the plurality of cooling holes break through the exterior surface at geometric coordinates in accordance with Cartesian coordinate values of X, Y and Z as set forth in Tables 1, 2 and 3. Each of the geometric coordinates is measured from a reference point on the body.

In a further embodiment of any of the above, the Cartesian coordinate values of Tables 1, 2 and 3 are expressed in inches.

In a further embodiment of any of the above, the reference point is provided on the inner arcuate surface at a midpoint between corners connecting the lateral faces to the inner arcuate surface.

In a further embodiment of any of the above, the Cartesian coordinate values are taken from the reference point relative to a reference plane that is tangent to the reference point. The reference plane is parallel to an engine axis plane that contains an engine axis.

In a further embodiment of any of the above, X values are taken along the reference plane. Positive X values are toward one of the corners and negative X values are toward the other of the corners. Y values are taken in a direction normal to the reference plane. Positive Y values are away from the engine axis and negative Y values are toward the engine axis. Z values are taken along the reference plane in the direction of the engine axis. Positive Z values are toward the forward rail and negative Z values are toward the aft rail.

In a further embodiment of any of the above, Table 1 values correspond to cooling holes on the inner arcuate surface.

In a further embodiment of any of the above, Table 2 values correspond to cooling holes on one of the lateral faces.

In a further embodiment of any of the above, Table 3 values correspond to cooling holes on one of the lateral faces.

In another exemplary embodiment, a blade outer air seal includes a body that extends axially between forward and aft rails and circumferentially between lateral faces. The body has an inner arcuate surface configured to seal relative to a blade tip. The body includes a plurality of cooling holes that extend through an exterior surface of the body. Each of plurality of cooling holes break through the exterior surface at geometric coordinates in accordance with Cartesian coordinate values of X, Y and Z as set forth in Table 1. Each of the geometric coordinates is measured from a reference point on the body. Table 1 values correspond to cooling holes on the inner arcuate surface.

In a further embodiment of any of the above, the Cartesian coordinate values of Table 1 are expressed in inches.

In a further embodiment of any of the above, the reference point is provided on the inner arcuate surface at a midpoint between corners connecting the lateral faces to the inner arcuate surface.

In a further embodiment of any of the above, the Cartesian coordinate values are taken from the reference point relative to a reference plane that is tangent to the reference point. The reference plane is parallel to an engine axis plane that contains an engine axis.

In a further embodiment of any of the above, X values are taken along the reference plane. Positive X values are toward one of the corners and negative X values are toward the other of the corners. Y values are taken in a direction normal to the reference plane. Positive Y values are away from the engine axis and negative Y values are toward the engine axis. Z values are taken along the reference plane in the direction of the engine axis. Positive Z values are toward the forward rail and negative Z values are toward the aft rail.

In another exemplary embodiment, a blade outer air seal includes a body that extends axially between forward and aft rails and circumferentially between lateral faces. The body has an inner arcuate surface that is configured to seal relative to a blade tip. The body includes a plurality of cooling holes that extend through an exterior surface of the body. Each of the plurality of cooling holes break through the exterior surface at geometric coordinates in accordance with Cartesian coordinate values of X, Y and Z as set forth in Table 2. Each of the geometric coordinates is measured from a reference point on the body. Table 2 values correspond to cooling holes on one of the lateral faces.

In a further embodiment of any of the above, the Cartesian coordinate values of Table 2 are expressed in inches.

In a further embodiment of any of the above, the reference point is provided on the inner arcuate surface at a midpoint between corners connecting the lateral faces to the inner arcuate surface.

In a further embodiment of any of the above, the Cartesian coordinate values are taken from the reference point relative to a reference plane that is tangent to the reference point. The reference plane is parallel to an engine axis plane that contains an engine axis.

In a further embodiment of any of the above, X values are taken along the reference plane. Positive X values are toward one of the corners and negative X values are toward the other of the corners. Y values are taken in a direction normal to the reference plane. Positive Y values are away from the engine axis and negative Y values are toward the engine axis. Z values are taken along the reference plane in the direction of the engine axis. Positive Z values are toward the forward rail and negative Z values are toward the aft rail.

In another exemplary embodiment, a blade outer air seal includes a body that extends axially between forward and aft rails and circumferentially between lateral faces. The body has an inner arcuate surface that is configured to seal relative to a blade tip. The body includes a plurality of cooling holes that extend through an exterior surface of the body. Each of the plurality of cooling holes break through the exterior surface at geometric coordinates in accordance with Cartesian coordinate values of X, Y and Z as set forth in Table 2. Each of the geometric coordinates is measured from a reference point on the body. Table 3 values correspond to cooling holes on one of the lateral faces.

In a further embodiment of any of the above, the Cartesian coordinate values of Table 3 are expressed in inches.

In a further embodiment of any of the above, the reference point is provided on the inner arcuate surface at a midpoint between corners connecting the lateral faces to the inner arcuate surface.

In a further embodiment of any of the above, the Cartesian coordinate values are taken from the reference point relative to a reference plane that is tangent to the reference point. The reference plane is parallel to an engine axis plane that contains an engine axis.

In a further embodiment of any of the above, X values are taken along the reference plane. Positive X values are toward one of the corners and negative X values are toward the other of the corners. Y values are taken in a direction normal to the reference plane. Positive Y values are away from the engine axis and negative Y values are toward the engine axis. Z values are taken along the reference plane in the direction of the engine axis. Positive Z values are toward the forward rail and negative Z values are toward the aft rail.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 3 is a radially inner view of a BOAS in accordance with this disclosure, showing cooling holes disposed therein;

FIG. 4 is a lateral side view of the BOAS of FIG. 3, showing a plurality of cooling holes disposed therein; and FIG. 5 is another lateral side view of the BOAS of FIG. 3, showing a plurality of cooling holes disposed therein.

DETAILED DESCRIPTION

Figure 1:
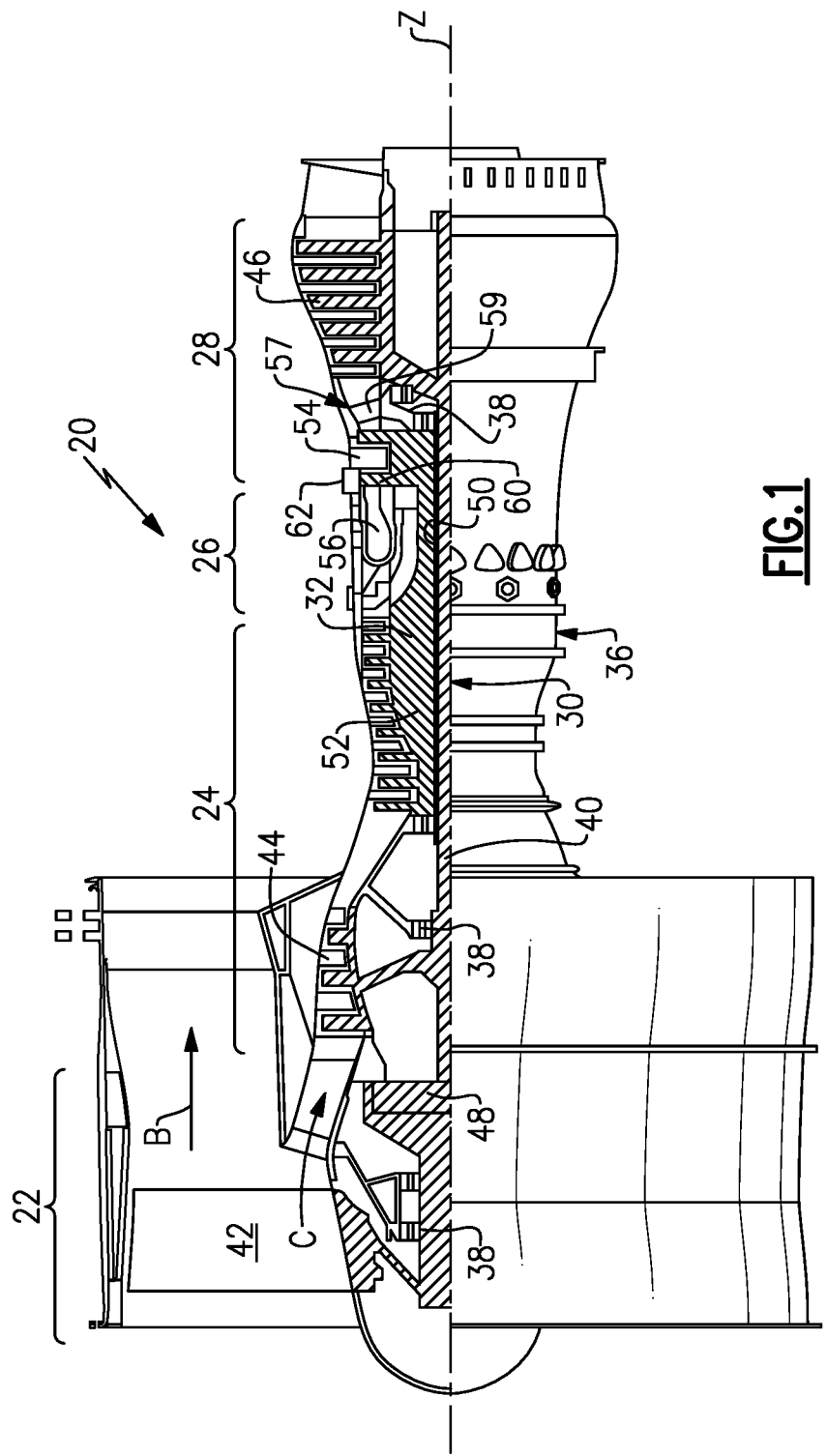
FIG. 1 is a schematic, partial cross-sectional view of a turbomachine in accordance with this disclosure.

Reference will now be made to the drawings wherein like reference numerals identify similar structural features or aspects of the subject disclosure. For purposes of explanation and illustration, and not limitation, an illustrative view of an embodiment of a blade outer air seal (BOAS) in accordance with the disclosure is shown in FIG. 2A and is designated generally by reference character 100. Other embodiments and/or aspects of this disclosure are shown in FIGS. 1, 2B, 3A, 3B, and 4. The systems and methods described herein can be used to provide enhanced cooling for BOAS.

Figure 2A:
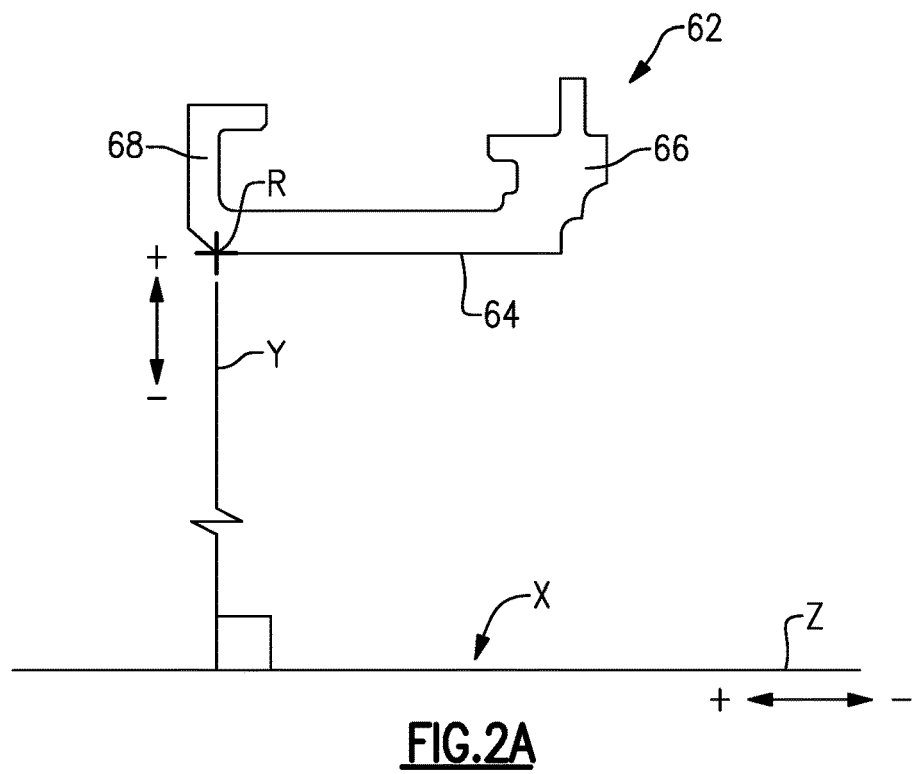
FIG. 2A is a schematic side view of a blade outer air seal (BOAS) in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28.

Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The illustrated engine 20 generally includes a low speed spool 30 and a high speed spool 32 mounted for rotation about an engine central longitudinal axis Z relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in illustrated gas turbine engine 20 is illustrated as a gear system 100 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis Z which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24 combustor section 26, turbine section 28 and fan gear system 100 may be varied. For example, gear system 100 may be located aft of combustor section 26 or even aft of turbine section 28, and fan section 22 may be positioned forward or aft of the location of gear system 100.

The engine 20 in one example is a high-bypass geared aircraft engine. In a further example, the engine 20 bypass ratio is greater than about six (6), with an example embodiment being greater than about ten (10), the geared architecture is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition-typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point, "Low fan pressure ratio" is the pressure ratio across the fan blade alone, without a Fan Exit Guide Vane 79 ("FEGV") system. The low fan pressure ratio as disclosed herein according to one non-limiting embodiment is less than about 1.45. "Low corrected fan tip speed" is the actual fan tip speed in ft/sec divided by an industry standard temperature, correction of [(Tram ° R)/(518.7° R)]^0.5. The "Low corrected fan tip speed" as disclosed herein according to one non-limiting embodiment is less than about 1.150 ft/second (350.5 meters/second).

Each of the compressor and turbine sections 24, 28 include stages of rotating blades 60. A circumferential array of blade outer air seals (BOAS) 62 are arranged radially outward of the blades 60 to provide a seal with respect to the blade tips. In the disclosed example, the BOAS 62 are provided in the first stage of the high pressure turbine 54.

Figure 2B:
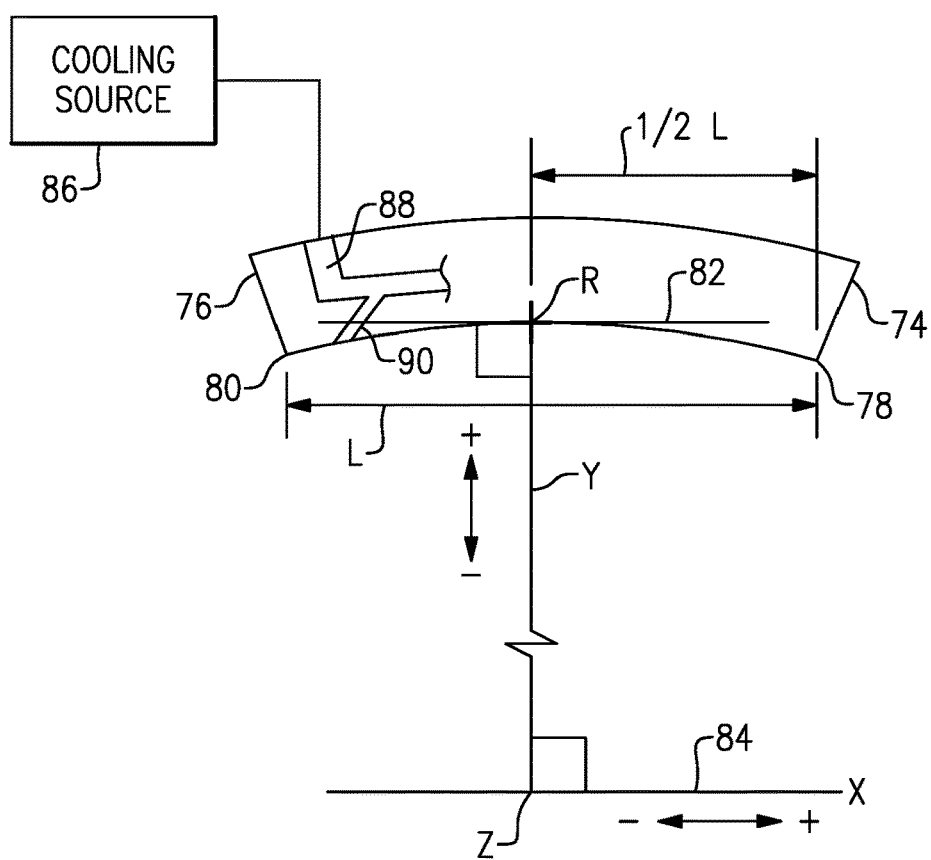
FIG. 2B is a schematic end view of the embodiment of the BOAS shown in FIG. 2A.

Referring to FIGS. 2A and 2B, the BOAS 62 is provided by a body extending axially in a direction of the engine axis Z between forward and aft rails 66, 68. The body extends circumferentially between lateral faces 74, 76 to provide an inner arcuate surface 64 configured to seal relative to a blade tip.

Cooling fluid from a cooling source 86, typically bleed air from the compressor section 24, is supplied to cooling passages 88 in the BOAS 62 that are fluidly connected to multiple cooling holes 90. The cooling holes 90 are illustrated as discrete numbered holes in FIGS. 3-5. The cooling holes 90 provide boundary layers of cooling fluid to thermally protect the BOAS 62 from the very high temperatures in the turbine section 28.

A reference point R (0, 0, 0) is provided on a reference plane 82 that is tangent to the inner arcuate surface 64. Corners 78, 80 respectively connect the lateral faces 74, 76 to the inner arcuate surface 64. The corners 78, 80 are at a distances L from one another. The reference point R is where a plane Y located at a distance ½ L, or the midpoint between the corners 78, 80, intersects the inner arcuate surface 64. The plane Y is normal to the reference plane. The reference plane 82 is parallel to an engine axis plane 84 that contains the engine axis Z. X values are taken along the reference plane 82, with positive X values toward the corner 78 and negative X values toward the corner 80. Y values are taken in a direction normal to the reference plane 82, with positive Y values away from the engine axis Z and negative Y values toward the engine axis Z. Z values are taken along the reference plane 82 in the direction of the engine axis Z, with positive Z values toward the forward rail 66 and negative Z values toward the aft rail 68.

The cooling holes 90 extend through an exterior surface of the BOAS 62, wherein each of the plurality of film cooling hole's centerline breaks through the exterior surface at geometric coordinates in accordance with Cartesian coordinate values of X, Y and Z as set forth in Tables 1, 2 and 3, produced below, wherein each of the geometric coordinates is measured from a reference point R on the BOAS 62.

TABLE 1

| Hole | X | Y | Z |
|---|---|---|---|
| 1 | 1.0483 | −0.058 | −0.088 |
| 2 | 0.865 | −0.039 | −0.068 |
| 3 | 0.652 | −0.022 | −0.068 |
| 4 | 0.439 | −0.011 | −0.068 |
| 5 | 0.225 | −0.003 | −0.068 |
| 6 | 0.011 | 0 | −0.068 |
| 7 | −0.203 | −0.002 | −0.068 |
| 8 | −0.417 | −0.009 | −0.068 |
| 9 | −0.631 | −0.021 | −0.068 |
| 10 | −0.844 | −0.037 | −0.068 |
| 11 | −1.057 | −0.059 | −0.068 |
| 12 | 1.064 | −0.059 | −0.278 |
| 13 | 0.912 | −0.043 | −0.308 |
| 14 | 0.721 | −0.027 | −0.288 |
| 15 | 0.526 | −0.014 | −0.288 |
| 16 | 0.331 | −0.006 | −0.288 |
| 17 | 0.135 | −0.001 | −0.288 |
| 18 | −0.06 | 0 | −0.288 |
| 19 | −0.255 | −0.003 | −0.288 |
| 20 | −0.5 | −0.011 | −0.288 |
| 21 | −0.644 | −0.022 | −0.288 |
| 22 | −0.84 | −0.037 | −0.288 |
| 23 | −1.034 | −0.056 | −0.288 |
| 24 | 1.057 | −0.059 | −0.472 |
| 25 | 0.865 | −0.039 | −0.472 |
| 26 | 0.654 | −0.022 | −0.472 |
| 27 | 0.441 | −0.01 | −0.472 |
| 28 | 0.227 | −0.003 | −0.472 |
| 29 | 0.013 | 0 | −0.472 |
| 30 | −0.201 | −0.002 | −0.472 |
| 31 | −0.415 | −0.009 | −0.472 |
| 32 | −0.629 | −0.021 | −0.472 |
| 33 | −0.842 | −0.037 | −0.472 |
| 34 | −1.055 | −0.058 | −0.472 |
| 35 | 1.062 | −0.059 | −0.643 |
| 36 | 0.937 | −0.046 | −0.643 |
| 37 | −1.054 | −0.058 | −0.643 |

TABLE 2

| Hole | X | Y | Z |
|---|---|---|---|
| 38 | 1.15 | 0.032 | −0.101 |
| 39 | 1.147 | 0.005 | −0.172 |
| 40 | 1.152 | 0.048 | −0.214 |
| 41 | 1.147 | 0.005 | −0.262 |
| 42 | 1.147 | 0.005 | −0.334 |
| 43 | 1.152 | 0.048 | −0.378 |
| 44 | 1.147 | 0.005 | −0.424 |
| 45 | 1.147 | 0.005 | −0.495 |
| 46 | 1.147 | 0.005 | −0.597 |
| 47 | 1.147 | 0.005 | −0.721 |
| 48 | 1.147 | 0.005 | −0.837 |
| 49 | 1.147 | 0.005 | −0.952 |
| 50 | 1.149 | 0.027 | −1.025 |
| 51 | 1.149 | 0.027 | −1.155 |
| 52 | 1.149 | 0.027 | −1.307 |

TABLE 3

| Hole | X | Y | Z |
|---|---|---|---|
| 53 | −1.149 | 0.027 | −1.258 |
| 54 | −1.149 | 0.027 | −1.093 |
| 55 | −1.147 | 0.005 | −0.895 |
| 56 | −1.147 | 0.005 | −0.779 |
| 57 | −1.147 | 0.005 | −0.664 |
| 58 | −1.151 | 0.043 | −0.568 |
| 59 | −1.147 | 0.005 | −0.54 |
| 60 | −1.15 | 0.033 | −0.453 |
| 61 | −1.147 | 0.005 | −0.379 |
| 62 | −1.15 | 0.032 | −0.298 |
| 63 | −1.147 | 0.005 | −0.217 |

TABLE 3-continued

| Hole | X | Y | Z |
|---|---|---|---|
| 64 | −1.15 | 0.033 | −0.148 |
| 65 | −1.147 | 0.005 | −0.051 |

Table 1 values correspond to cooling holes 90 on the inner arcuate surface 64. Table 2 and 3 values correspond to cooling holes 90 on the lateral faces 74, 76, respectively. The locations are presented in Tables 1, 2 and 3 in cold, coated, and stationary condition and are subject to change based on finishing of the BOAS 62. The coordinates are expressed in inches. One having ordinary skill in the art will appreciate that new locations of cooling holes relative to any suitable reference can be determined in any suitable manner based on the procedures involved in finishing the BOAS 62. Holes are located with included part tolerances and a hole true position of about +/−0.020 inches or 0.51 mm. As described herein, cooling holes 90 can include any suitable cross-sectional shape, such as, but not limited to, circular, elliptical, and/or any other symmetric or non-symmetric shape.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade, or vane, or that the part or structure is sufficiently the same with respect to a part design in a type-certified or type-certificated BOAS, such that the part or structure complies with airworthiness standards applicable to the specified blade, vane or airfoil. In particular, substantial conformance encompasses any regulatory determination that a particular part or structure is sufficiently similar to, identical to, or the same as a specified BOAS, such that certification or authorization for use is based at least in part on the determination of similarity.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

The invention claimed is:

1. A blade outer air seal comprising:
a body extending axially between forward and aft rails and circumferentially between lateral faces, the body has an inner arcuate surface configured to seal relative to a blade tip, the body includes a plurality of cooling holes that extend through an exterior surface of the body, wherein each of the plurality of cooling holes break through the exterior surface at geometric coordinates in accordance with Cartesian coordinate values of X, Y and Z as set forth in Tables 1, 2 and 3, wherein each of the geometric coordinates is measured from a reference point on the body.

2. The blade outer air seal as recited in claim 1, wherein the Cartesian coordinate values of Tables 1, 2 and 3 are expressed in inches.

3. The blade outer air seal as recited in claim 1, wherein the reference point is provided on the inner arcuate surface at a midpoint between corners connecting the lateral faces to the inner arcuate surface.

4. The blade outer air seal as recited in claim 3, wherein the Cartesian coordinate values are taken from the reference point relative to a reference plane that is tangent to the reference point, the reference plane is parallel to an engine axis plane that contains an engine axis.

5. The blade outer air seal as recited in claim 4, wherein X values are taken along the reference plane, with positive X values toward one of the corners and negative X values toward the other of the corners, wherein Y values are taken in a direction normal to the reference plane, with positive Y values away from the engine axis and negative Y values toward the engine axis, wherein Z values are taken along the reference plane in the direction of the engine axis, with positive Z values toward the forward rail and negative Z values toward the aft rail.

6. The blade outer air seal as recited in claim 1, wherein Table 1 values correspond to cooling holes on the inner arcuate surface.

7. The blade outer air seal as recited in claim 1, wherein Table 2 values correspond to cooling holes on one of the lateral faces.

8. The blade outer air seal as recited in claim 1, wherein Table 3 values correspond to cooling holes on one of the lateral faces.

9. A blade outer air seal comprising:
a body extending axially between forward and aft rails and circumferentially between lateral faces, the body has an inner arcuate surface configured to seal relative to a blade tip, the body includes a plurality of cooling holes that extend through an exterior surface of the body, wherein each of the plurality of cooling holes break through the exterior surface at geometric coordinates in accordance with Cartesian coordinate values of X, Y and Z as set forth in Table 1, wherein each of the geometric coordinates is measured from a reference point on the body, wherein Table 1 values correspond to cooling holes on the inner arcuate surface.

10. The blade outer air seal as recited in claim 9, wherein the Cartesian coordinate values of Table 1 are expressed in inches.

11. The blade outer air seal as recited in claim 9, wherein the reference point is provided on the inner arcuate surface at a midpoint between corners connecting the lateral faces to the inner arcuate surface.

12. The blade outer air seal as recited in claim 11, wherein the Cartesian coordinate values are taken from the reference point relative to a reference plane that is tangent to the reference point, the reference plane is parallel to an engine axis plane that contains an engine axis.

13. The blade outer air seal as recited in claim 12, wherein X values are taken along the reference plane, with positive X values toward one of the corners and negative X values toward the other of the corners, wherein Y values are taken in a direction normal to the reference plane, with positive Y values away from the engine axis and negative Y values toward the engine axis, wherein Z values are taken along the reference plane in the direction of the engine axis, with positive Z values toward the forward rail and negative Z values toward the aft rail.

14. A blade outer air seal comprising:
a body extending axially between forward and aft rails and circumferentially between lateral faces, the body has an inner arcuate surface configured to seal relative to a blade tip, the body includes a plurality of cooling holes that extend through an exterior surface of the body, wherein each of the plurality of cooling holes break through the exterior surface at geometric coordinates in accordance with Cartesian coordinate values of X, Y and Z as set forth in Table 2, wherein each of the geometric coordinates is measured from a reference point on the body, wherein Table 2 values correspond to cooling holes on one of the lateral faces.

15. The blade outer air seal as recited in claim 14, wherein the Cartesian coordinate values of Table 2 are expressed in inches.

16. The blade outer air seal as recited in claim 14, wherein the reference point is provided on the inner arcuate surface at a midpoint between corners connecting the lateral faces to the inner arcuate surface.

17. The blade outer air seal as recited in claim 16, wherein the Cartesian coordinate values are taken from the reference point relative to a reference plane that is tangent to the reference plane, the reference plane is parallel to an engine axis plane that contains an engine axis.

18. The blade outer air seal as recited in claim 17, wherein X values are taken along the reference plane, with positive X values toward one of the corners and negative X values toward the other of the corners, wherein Y values are taken in a direction normal to the reference plane, with positive Y values away from the engine axis and negative Y values toward the engine axis, wherein Z values are taken along the reference plane in the direction of the engine axis, with positive Z values toward the forward rail and negative Z values toward the aft rail.

19. A blade outer air seal comprising:
a body extending axially between forward and aft rails and circumferentially between lateral faces, the body has an inner arcuate surface configured to seal relative to a blade tip, the body includes a plurality of cooling holes that extend through an exterior surface of the body, wherein each of the plurality of cooling holes break through the exterior surface at geometric coordinates in accordance with Cartesian coordinate values of X, Y and Z as set forth in Table 3, wherein each of the geometric coordinates is measured from a reference point on the body, wherein Table 3 values correspond to cooling holes on one of the lateral faces.

20. The blade outer air seal as recited in claim 19, wherein the Cartesian coordinate values of Table 3 are expressed in inches.

21. The blade outer air seal as recited in claim 19, wherein the reference point is provided on the inner arcuate surface at a midpoint between corners connecting the lateral faces to the inner arcuate surface.

22. The blade outer air seal as recited in claim 21, wherein the Cartesian coordinate values are taken from the reference point relative to a reference plane that is tangent to the reference point, the reference plane is parallel to an engine axis plane that contains an engine axis.

23. The blade outer air seal as recited in claim 22, wherein X values are taken along the reference plane, with positive X values toward one of the corners and negative X values toward the other of the corners, wherein Y values are taken in a direction normal to the reference plane, with positive Y values away from the engine axis and negative Y values toward the engine axis, wherein Z values are taken along the reference plane in the direction of the engine axis, with positive Z values toward the forward rail and negative Z values toward the aft rail.

* * * * *